United States Patent
Komachi et al.

(10) Patent No.: US 10,522,912 B2
(45) Date of Patent: Dec. 31, 2019

(54) ANTENNA DEVICE AND MOBILE WIRELESS DEVICE PROVIDED WITH THE SAME

(71) Applicant: TDK Corporation, Tokyo (JP)

(72) Inventors: Toshifumi Komachi, Tokyo (JP); Toshio Tomonari, Tokyo (JP); Hirohumi Asou, Tokyo (JP)

(73) Assignee: TDK Corporation, Tokyo (JP)

( * ) Notice: Subject to any disclaimer, the term of this patent is extended or adjusted under 35 U.S.C. 154(b) by 236 days.

(21) Appl. No.: 15/585,021

(22) Filed: May 2, 2017

(65) Prior Publication Data
US 2017/0331191 A1    Nov. 16, 2017

(30) Foreign Application Priority Data

May 12, 2016 (JP) ................. 2016-096309
May 12, 2016 (JP) ................. 2016-096310
May 12, 2016 (JP) ................. 2016-096311

(51) Int. Cl.

| | | |
|---|---|---|
| *H01Q 1/36* | (2006.01) | |
| *H01Q 7/06* | (2006.01) | |
| *H01Q 1/38* | (2006.01) | |
| *H01Q 1/24* | (2006.01) | |
| *H01Q 5/314* | (2015.01) | |
| *H01Q 7/00* | (2006.01) | |
| *H01Q 1/22* | (2006.01) | |

(52) U.S. Cl.
CPC ............ *H01Q 7/06* (2013.01); *H01Q 1/2225* (2013.01); *H01Q 1/24* (2013.01); *H01Q 1/38* (2013.01); *H01Q 5/314* (2015.01); *H01Q 7/005* (2013.01)

(58) Field of Classification Search
CPC ........ H01Q 7/06; H01Q 5/314; H01Q 1/2225; H01Q 1/24; H01Q 1/243; H01Q 1/38; H01Q 7/005; H04B 5/0081
See application file for complete search history.

(56) References Cited

U.S. PATENT DOCUMENTS

| | | | | |
|---|---|---|---|---|
| 2010/0053014 A1* | 3/2010 | Yosui | ............. | H01Q 1/20 343/787 |
| 2012/0086556 A1* | 4/2012 | Ikemoto | ............. | G06K 19/07749 340/10.1 |

(Continued)

FOREIGN PATENT DOCUMENTS

JP    5708897 A1    1/2017

OTHER PUBLICATIONS

Ahn et al., A Fully Integrated Surface Micromachined Magnetic Microactuator with a Multilevel Meander, Journal of Microelectromechanical Systems, vol. 2, No. 1, Mar. 1993 (Year: 1993).*

*Primary Examiner* — Hai V Tran
*Assistant Examiner* — Bamidele A Jegede
(74) *Attorney, Agent, or Firm* — Young Law Firm, P.C.

(57) ABSTRACT

Disclosed herein is an antenna device including a first metal layer having first and second areas, a coil pattern having first and second terminals, a first wiring pattern connected between the first area of the first metal layer and the first terminal of the coil pattern, and a second wiring pattern connected between the second area of the first metal layer and the second terminal of the coil pattern. The first metal layer, the first wiring pattern, and the second wiring pattern constitute at least a part of a loop antenna.

31 Claims, 14 Drawing Sheets

(56) References Cited

U.S. PATENT DOCUMENTS

| | | | | |
|---|---|---|---|---|
| 2012/0162028 A1* | 6/2012 | Kubo | ............... | H01M 2/1066 |
| | | | | 343/702 |
| 2012/0206239 A1* | 8/2012 | Ikemoto | ............ | G06K 7/10346 |
| | | | | 340/10.1 |
| 2013/0147675 A1* | 6/2013 | Kato | ............... | H01Q 1/38 |
| | | | | 343/788 |
| 2013/0181876 A1* | 7/2013 | Miura | ............... | G06K 7/10316 |
| | | | | 343/788 |
| 2013/0229319 A1* | 9/2013 | Miura | ............... | H01Q 7/06 |
| | | | | 343/788 |
| 2013/0320553 A1* | 12/2013 | Kuo | ............... | H01L 23/528 |
| | | | | 257/774 |
| 2014/0035793 A1* | 2/2014 | Kato | ............... | H01Q 1/243 |
| | | | | 343/867 |
| 2014/0043196 A1* | 2/2014 | Gouchi | ............... | H01Q 7/06 |
| | | | | 343/788 |
| 2014/0191916 A1* | 7/2014 | Ito | ............... | H01Q 7/06 |
| | | | | 343/788 |
| 2014/0203992 A1* | 7/2014 | Nakano | ............... | H01Q 7/00 |
| | | | | 343/867 |
| 2015/0116168 A1 | 4/2015 | Yosui | | |

* cited by examiner

ANTENNA DEVICE AND MOBILE WIRELESS DEVICE PROVIDED WITH THE SAME

BACKGROUND OF THE INVENTION

Field of the Invention

The present invention relates to an antenna device and a mobile wireless device provided with the antenna device and, more particularly, to an antenna device suitable for NFC (Near Field Communication) system and a mobile wireless device provided with the antenna device.

Description of Related Art

In recent years, an RFID (Radio Frequency Identification) system is implemented in a mobile wireless device such as a smartphone, and such a mobile wireless device is provided with an antenna device for performing near field communication with a reader/writer as a communication means. As an antenna device of such a type, an antenna device described in Japanese Patent No. 5,708,897 is known.

The antenna device described in Japanese Patent No. 5,708,897 has a configuration in which both ends of a radiation conductor are connected to a ground pattern to constitute a loop antenna.

However, in the antenna device described in Japanese Patent No. 5,708,897, only one loop antenna is constituted by the radiation conductor and ground pattern, so that a communication distance may become insufficient.

Further, in the antenna device described in Japanese Patent No. 5,708,897, the radiation conductor is provided on a plane position different from that of the ground pattern, so that the antenna device becomes disadvantageously large in planar size.

SUMMARY

It is therefore an object of the present invention to provide an antenna device with an extended communication distance and a mobile wireless device provided with the antenna device.

Another object of the present invention is to provide an antenna device with a reduced planar size and a mobile wireless device provided with the antenna device.

An antenna device according to an aspect of the present invention includes: a first metal layer having first and second areas; a coil pattern having first and second terminals; a first wiring pattern connected between the first area of the first metal layer and the first terminal of the coil pattern; and a second wiring pattern connected between the second area of the first metal layer and the second terminal of the coil pattern. At least a part of a loop antenna is formed by the first metal layer, first wiring pattern, and second wiring pattern.

A mobile wireless device according to an aspect of the present invention includes the above antenna device.

According to the present invention, the coil pattern and the loop antenna are connected in series to each other, so that a communication distance can be extended as compared with a case with the loop antenna alone. The coil pattern may include a solenoid coil obtained by winding a conductor around a plate-like magnetic member or a meander conductor. When the meander conductor is used, it is preferable that the coil pattern further includes a waveform magnetic member and the vertical positions of the magnetic member and the conductor are alternately switched between adjacent conductors.

In the present invention, the coil pattern preferably does not overlap the first metal layer in a plan view. With this configuration, the size of the inner diameter part of the loop antenna can be increased.

The antenna device according to the present invention preferably further includes a first transmission/reception circuit connected to the first or second wiring pattern and a second transmission/reception circuit connected to the first metal layer and having a signal transmission/reception frequency band which is different from that used in the first transmission/reception circuit. With this configuration, the first metal layer not only constitutes a part of the loop antenna, but also functions as a radiation conductor of another antenna device. In this case, the antenna device preferably further includes an inductance element inserted into the first or second wiring pattern. This allows signal components of two antenna devices to be separated from each other.

The antenna device according to the present invention preferably further includes a circuit substrate arranged in parallel with the first metal layer. In this case, the first wiring pattern preferably includes a first wiring formed on the circuit substrate and a first connection pin provided perpendicular to the circuit substrate and connecting one end of the first wiring and the first area of the first metal layer, and the second wiring pattern preferably includes a second wiring formed on the circuit substrate and a second connection pin provided perpendicular to the circuit substrate and connecting one end of the second wiring and the second area of the first metal layer. With the above configuration, the loop antenna has a three-dimensional shape, making it possible to capture horizontal magnetic flux as well.

In this case, the first wiring pattern preferably includes a third connection pin provided perpendicular to the circuit substrate and connecting the other end of the first wiring and the first terminal of the coil pattern, and the second wiring pattern preferably includes a fourth connection pin provided perpendicular to the circuit substrate and connecting the other end of the second wiring and the second terminal of the coil pattern. This increases the degree of three-dimensionality of the loop antenna.

The antenna device according to the present invention preferably further includes a second metal layer opposed to the first metal layer through a slit and constitutes the same plane as that of the first metal layer. In this case, at least a part of the coil pattern preferably overlaps the second metal layer in a plan view. In such a configuration, the second metal layer serves as an electromagnetic shield to degrade antenna characteristics; however, the present invention can still allow for proper communications.

In the present invention, the first area of the first metal layer and the first terminal of the coil pattern may be connected to each other through at least the first wiring pattern and second metal layer, whereby at least a part of the loop antenna is formed by the first metal layer, second metal layer, first wiring pattern, and second wiring pattern. With this configuration, the size of the inner diameter part of the loop antenna can be increased, and the degree of freedom in design can also be improved.

An antenna device according to another aspect of the present invention includes: a first metal layer having first and second areas; and a coil pattern overlapping the first metal layer in a plan view and having first and second terminals. The first area of the first metal layer and the first terminal of the coil pattern are connected to each other, and the second area of the first metal layer and the second terminal of the coil pattern are connected to each other.

A mobile wireless device according to another aspect of the present invention includes the above antenna device.

According to the present invention, the coil pattern overlaps the first metal layer, so that the planar size of the antenna device can be reduced. In addition, the first metal layer is connected to the coil pattern, and thus a large loop is formed through the first metal layer, thereby making it possible to obtain enhanced antenna characteristics. The coil pattern may include a solenoid coil obtained by winding a conductor around a plate-like magnetic member or a meander conductor. When the meander conductor is used, it is preferable that the coil pattern further includes a waveform magnetic member and the vertical positions of the magnetic member and conductor are alternately switched between adjacent conductors.

The antenna device according to the present invention preferably further includes a transmission/reception circuit inserted into the coil pattern. With this configuration, a larger loop can be formed as compared with a case where the transmission/reception circuit is directly connected to the first and second terminals of the coil pattern.

The antenna device according to the present invention preferably further includes a second metal layer opposed to the first metal layer through a slit and constitutes the same plane as that of the first metal layer. In this case, one end portion of the coil pattern in the axial direction thereof is preferably positioned in the vicinity of the slit. In such a configuration, the first and second metal layers serve as an electromagnetic shield to degrade antenna characteristics; however, the present invention can still allow for proper communications.

An antenna device according to still another aspect of the present invention includes: a first metal layer; a second metal layer provided in a plane different from that of the first metal layer and having first and second areas; a coil pattern at least a part of which overlaps the first metal layer in a plan view and having first and second terminals; a first wiring pattern connected between the first area of the second metal layer and the first terminal of the coil pattern; and a second wiring pattern connected between the second area of the second metal layer and the second terminal of the coil pattern. At least a part of a loop antenna is formed by the second metal layer, first wiring pattern and second wiring pattern.

The antenna device according to the present invention preferably further includes a third metal layer opposed to the first metal layer through a slit and constituting the same plane as that of the first metal layer. In this case, the inner diameter part of the loop antenna preferably overlaps at least partially the slit in a plan view. In such a configuration, the first and third metal layers serve as an electromagnetic shield to degrade antenna characteristics; however, the present invention can still allow for proper communications.

The antenna device according to the present invention preferably further includes a circuit substrate on which the second metal layer is formed. In this case, the first wiring pattern preferably includes a first wiring formed on the circuit substrate and having one end connected to the first area of the second metal layer and a first connection pin provided perpendicular to the circuit substrate and connecting the other end of the first wiring and the first terminal of the coil pattern, and the second wiring pattern preferably includes a second wiring formed on the circuit substrate and having one end connected to the second area of the second metal layer and a second connection pin provided perpendicular to the circuit substrate and connecting the other end of the second wiring and the second terminal of the coil pattern. With the above configuration, connection in the vertical direction can be established by the connection pins.

In the present invention, the first area of the second metal layer and the first terminal of the coil pattern may be connected to each other through at least the first wiring pattern and first metal layer, whereby at least a part of the loop antenna is formed by the first metal layer, second metal layer, first wiring pattern, and second wiring pattern. With this configuration, the size of the inner diameter part of the loop antenna can be increased, and the degree of freedom in design can also be improved.

According to one aspect of the present invention, there can be provided an antenna device with an extended communication distance and a mobile wireless device provided with the antenna device.

According to another aspect of the present invention, there can be provided an antenna device with a reduced planar size and an extended communication distance and a mobile wireless device provided with the antenna device.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

<First Embodiment>

Figure 1:
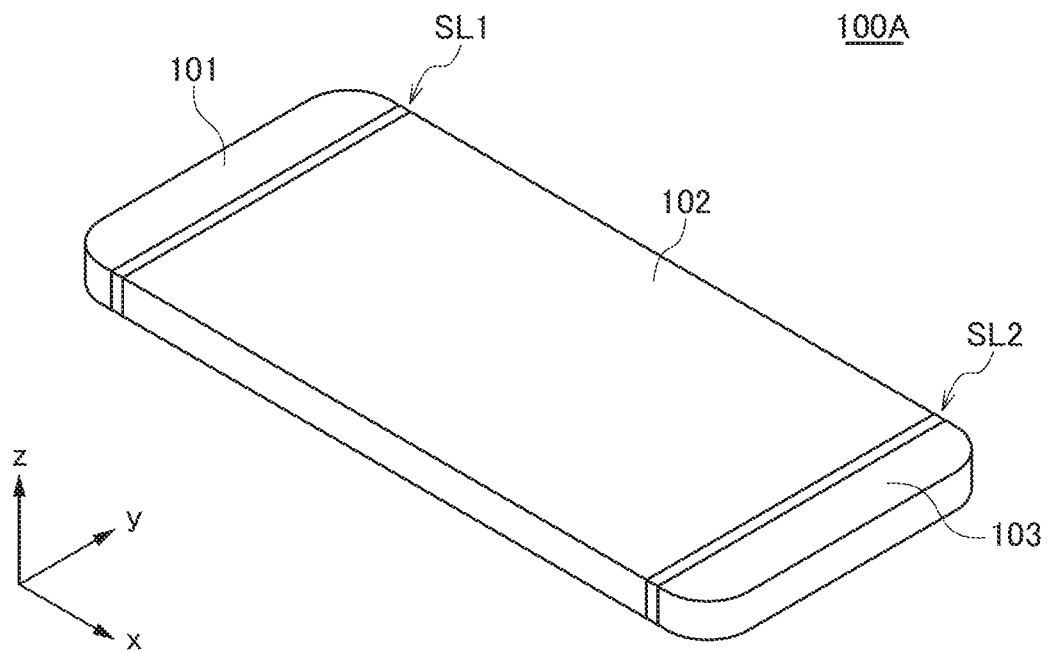
FIG. 1 is a schematic perspective view illustrating the outer appearance of a mobile wireless device provided with an antenna device according to a first embodiment of the present invention.

FIG. 1 is a schematic perspective view illustrating the outer appearance of a mobile wireless device 100A provided with an antenna device according to the first embodiment of the present invention.

The mobile wireless device 100A illustrated in FIG. 1 is, e.g., a smartphone and has a thin box-shaped casing. FIG. 1 is a view illustrating the mobile wireless device 100A when viewed from the back surface side thereof, and the front surface side thereof on which a display and the like are provided faces downward. The casing of the mobile wireless device 100A is made of resin and metal, and the center portion of the casing constituting most of the back surface thereof is made of a metal layer 102. Metal layers 101 and 103 are provided on both respective sides of the metal layer 102 in the longitudinal direction (x-direction) of the mobile wireless device 100A.

The metal layers 101 to 103 constitute the same xy plane. The metal layers 101 and 102 are opposed to each other through a slit SL1, and the metal layers 102 and 103 are opposed to each other through a slit SL2. The slits SL1 and SL2 extend in the y-direction on the back surface of the casing and extend in the z-direction on the side surfaces of the casing. The reason that a wide range of the casing back surface is made of the metal layers 101 to 103 is mainly to improve mechanical strength, electromagnetic shielding characteristics, and designability, etc. of the casing.

Figure 2:
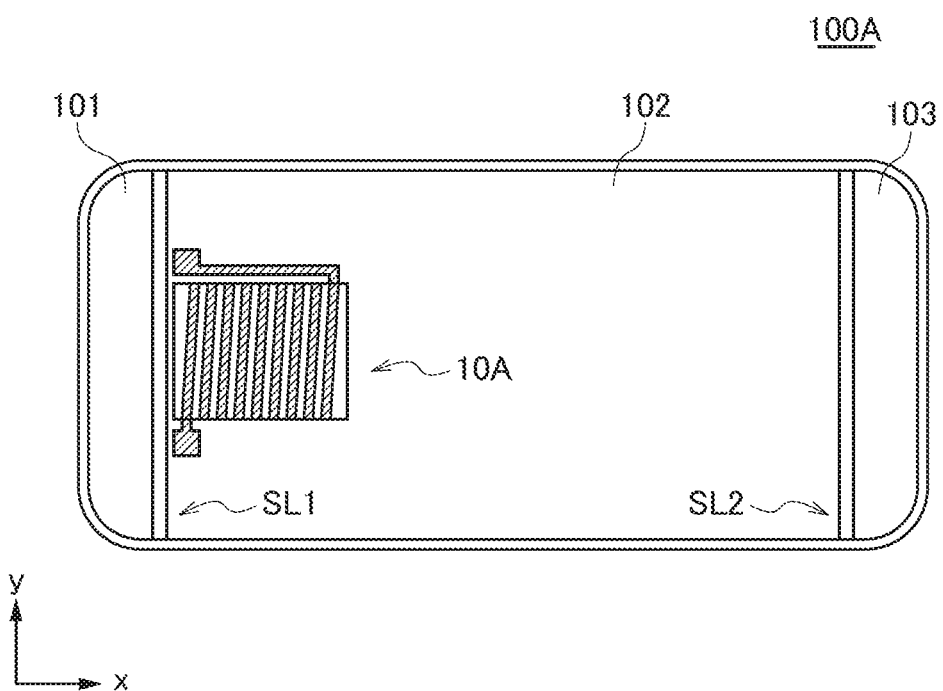
FIG. 2 is a plan view of the back surface of the mobile wireless device when viewed from the inner side.

FIG. 2 is a plan view of the back surface of the mobile wireless device 100A when viewed from the inner side.

Figure 3:
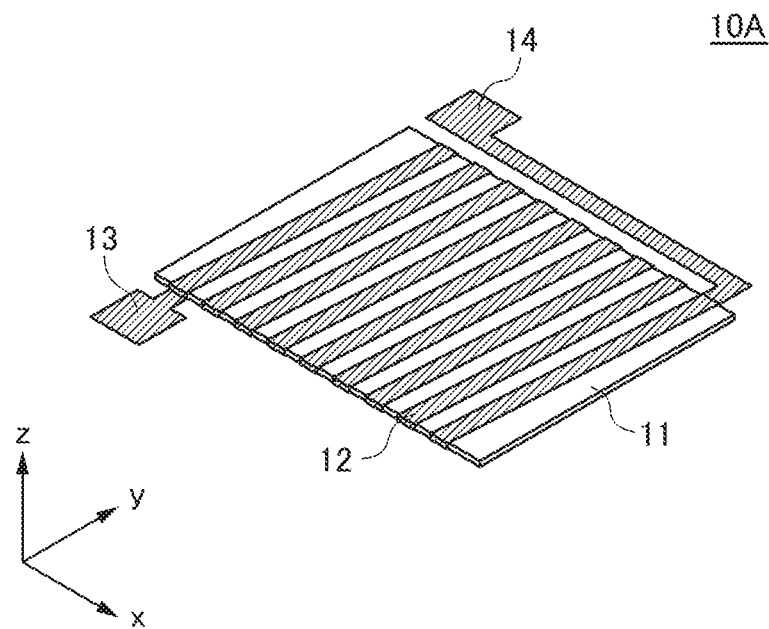
FIG. 3 is a schematic perspective view illustrating a solenoid coil.

As illustrated in FIG. 2, inside the mobile wireless device 100A, a solenoid coil 10A is provided so as to overlap the metal layer 102 in a plan view (when viewed in the z-direction). The solenoid coil 10A and metal layer 101 do not overlap each other. As illustrated in FIG. 3, which is a perspective view of the solenoid coil 10A, the solenoid coil 10A is a thin type coil pattern configured by a plurality of turns of a conductor 12 wound around a plate-like magnetic member 11, and the coil axis thereof extends in the x-direction. The magnetic member 11 is a plate-like body having the xy plane and is disposed such that one side thereof extending in the y-direction is positioned in the vicinity of the slit SL1. One end of the conductor 12 constitutes a first terminal 13, and the other end thereof constitutes a second terminal 14. In the present embodiment, the conductor 12 and metal layer 102 are electrically insulated from each other.

Figure 4:
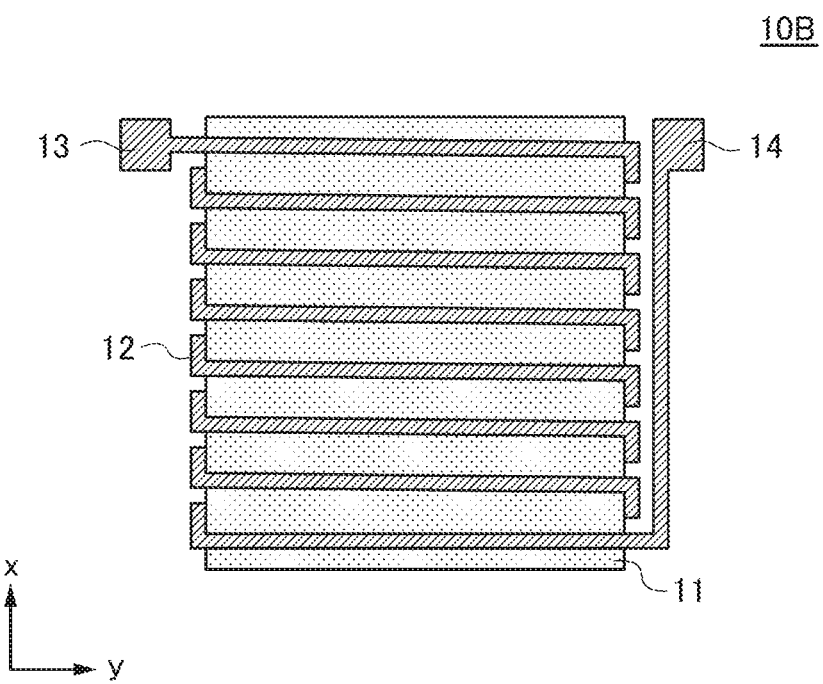
FIG. 4 is a schematic perspective view illustrating a meander coil.
Figure 5:
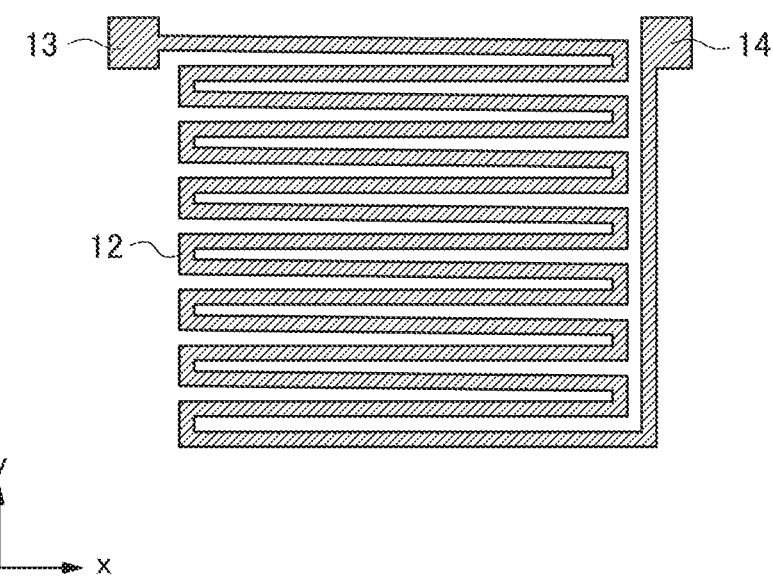
FIG. 5 is a schematic perspective view illustrating the meander coil in which the magnetic member is omitted.

However, the coil pattern used in the present invention is not limited to the solenoid coil 10A, and a meander coil 10B illustrated in FIG. 4 may be used. As illustrated in FIG. 5, in which the magnetic member 11 is omitted, the meander coil 10B has a planar conductor 12 formed so as to be folded a plurality of times in the x-direction. Assuming that the first terminal 13 of the conductor 12 is the winding start point and the second terminal 14 is the winding end point, the magnetic member 11 is made to meander in the z-direction so that a part of the conductor 12 that extends in the plus x-direction is upside, and a part of the conductor 12 that extends in the minus x-direction is downside, whereby the same coil configuration as that of the solenoid coil 10A illustrated in FIG. 3 can be obtained. In this case, as the magnetic member 11, a sheet material having flexibility high enough to meander in the z-direction is preferably used. Further, the magnetic member 11 may be omitted, that is, only the meander conductor 12 may be used.

Figure 6:
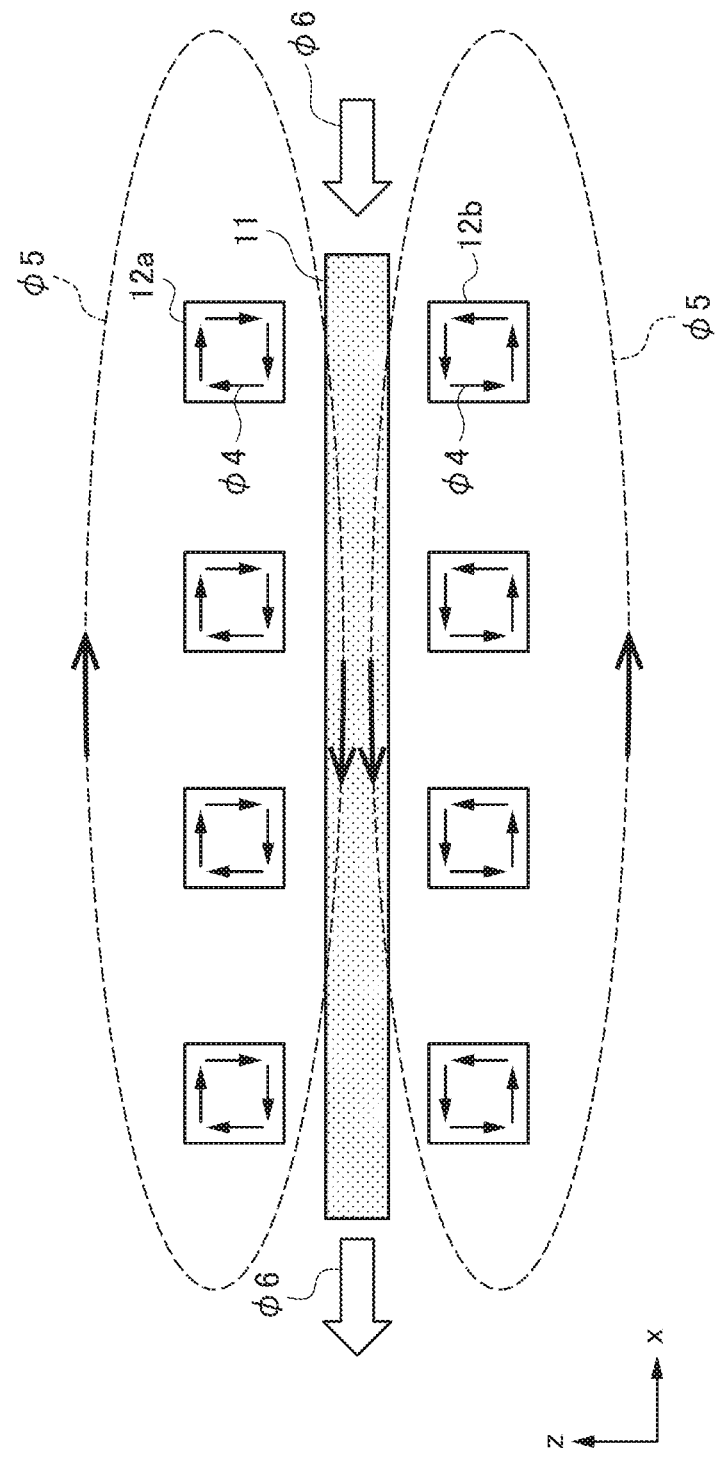
FIG. 6 is a schematic view for explaining the direction of magnetic flux generated by the solenoid coil.
Figure 7:
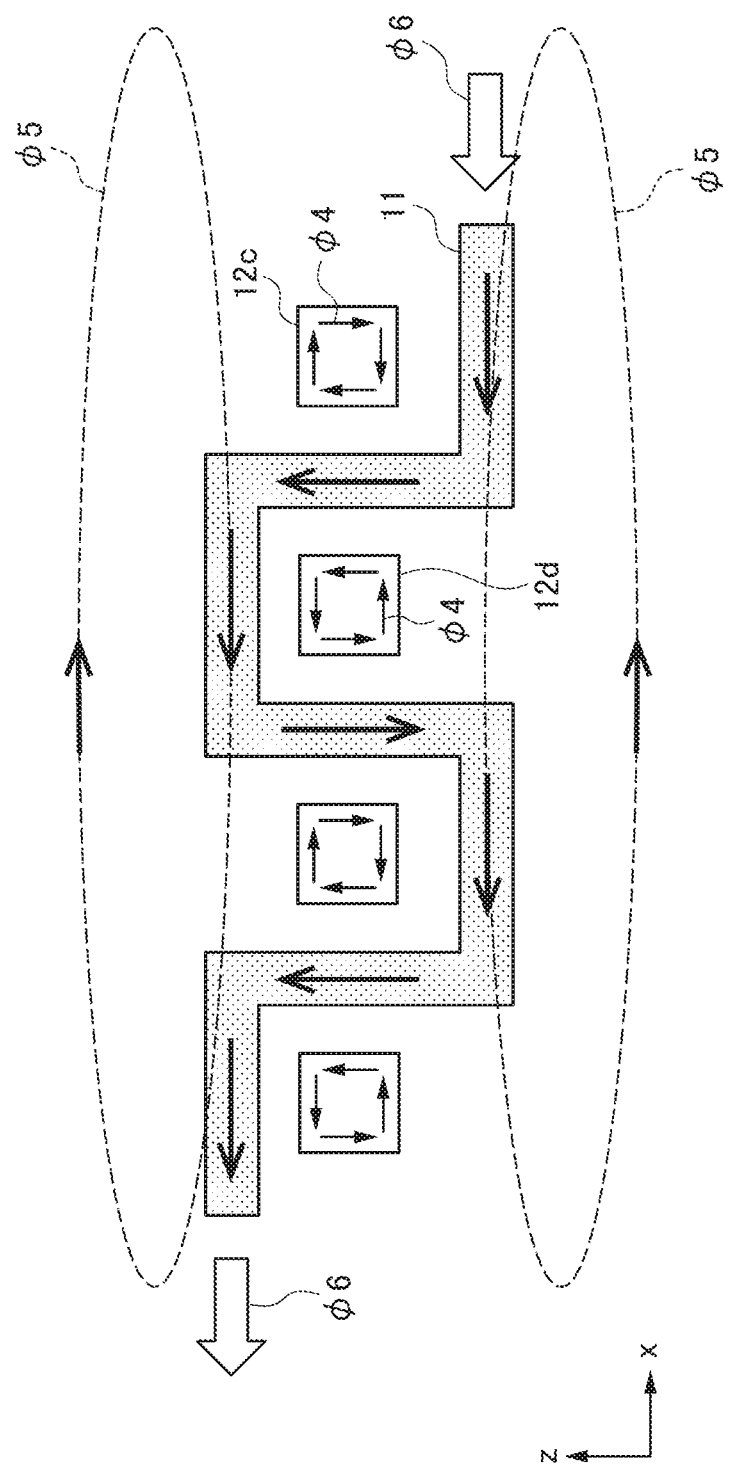
FIG. 7 is a schematic view for explaining the direction of magnetic flux generated by the meander coil.

FIG. 6 is a schematic view for explaining the direction of magnetic flux generated by the solenoid coil 10A, and FIG. 7 is a schematic view for explaining the direction of magnetic flux generated by the meander coil 10B.

In the solenoid coil 10A, current flows in the opposite directions in a conductor 12a positioned on the upper side of the magnetic member 11 and in a conductor 12b positioned on the lower side of the magnetic member 11. Therefore, assuming that a clockwise magnetic flux $\phi 4$ is generated around the conductor 12a as a result of application of current to the conductor 12, a counterclockwise magnetic flux $\phi 4$ is generated around the conductor 12b. As a result, a clockwise magnetic flux $\phi 5$ is generated on the conductor 12a side (on the upper side of the magnetic member 11) so as to surround the entire conductor 12a, while a counterclockwise magnetic flux $\phi 5$ is generated on the conductor 12b side (on the lower side of the magnetic member 11) so as to surround the entire conductor 12b. Since the magnetic member 11 is sandwiched between the conductors 12a and 12b, the directions of the clockwise and counterclockwise magnetic fluxes $\phi 5$ passing through the magnetic member 11 coincide with each other, with the result that a magnetic flux $\phi 6$ generated in the entire solenoid coil 10A flows in one direction (minus x-direction in the example of FIG. 6).

On the other hand, as illustrated in FIG. 7, in the meander coil 10B, there is no substantial difference between the positions of conductors 12c and 12d in the z-direction, and it follows that the waveform magnetic member 11 meandering between the conductors 12c and 12d adjacent to each other in the x-direction is interposed therebetween. Specifically, for the even-numbered conductor 12c, the magnetic member 11 is positioned on both sides in the x-direction and on the lower side in the z-direction; while for the odd-numbered conductor 12d, the magnetic member 11 is positioned on both sides in the x-direction and on the upper side in the z-direction. That is, the vertical positions of the magnetic member 11 are alternately changed such that one of the adjacent conductors 12c and 12d is on the upper side of the magnetic member 11, and the other one of them is on the lower side of the magnetic member 11.

Current flows in the opposite directions in the conductors 12c and 12d adjacent to each other in the x-direction, so that, as illustrated in FIG. 7, assuming that a clockwise magnetic flux $\phi 4$ is generated around the even-numbered conductor 12c as a result of application of current to the conductor 12, a counterclockwise magnetic flux $\phi 4$ is generated around the odd-numbered conductor 12d. However, the magnetic member 11 meandering in the z-direction is interposed between the conductors 12c and 12d adjacent to each other in the x-direction, so that a magnetic flux $\phi 5$ generated on the upper side of the magnetic member 11 and a magnetic flux $\phi 5$ generated on the lower side of the magnetic member 11 do not cancel each other. That is, a clockwise magnetic flux $\phi 5$ is generated on the even-numbered conductor 12c side (on the upper side of the magnetic member 11) so as to surround the entire conductor 12, while a counterclockwise magnetic flux $\phi 5$ is generated on the odd-numbered conductor 12d side (on the lower side of the magnetic member 11) so as to surround the entire conductor 12. Since the magnetic member 11 is disposed so as to meander between the conductors 12c and 12d in the z-direction, the directions of the clockwise and counterclockwise magnetic fluxes φ5 passing through the magnetic member 11 coincide with each other, with the result that a magnetic flux φ6 generated in the entire meander coil 10B flows in one direction (minus x-direction in the example of FIG. 7).

As described above, in the meander coil 10B, the positions of the conductors 12c and 12d in the z-direction is substantially fixed, so that the meander coil 10B can be reduced further in thickness as compared with the solenoid coil 10A. In addition, the magnetic member 11 meanders in the z-direction, so that, as illustrated in FIG. 7, the magnetic flux φ5 generated on the upper side of the magnetic member 11 and the magnetic flux φ5 generated on the lower side of the magnetic member 11 spread wider in the z-direction than in the solenoid coil 10A, whereby satisfactory antenna characteristics can be obtained.

Figure 8:
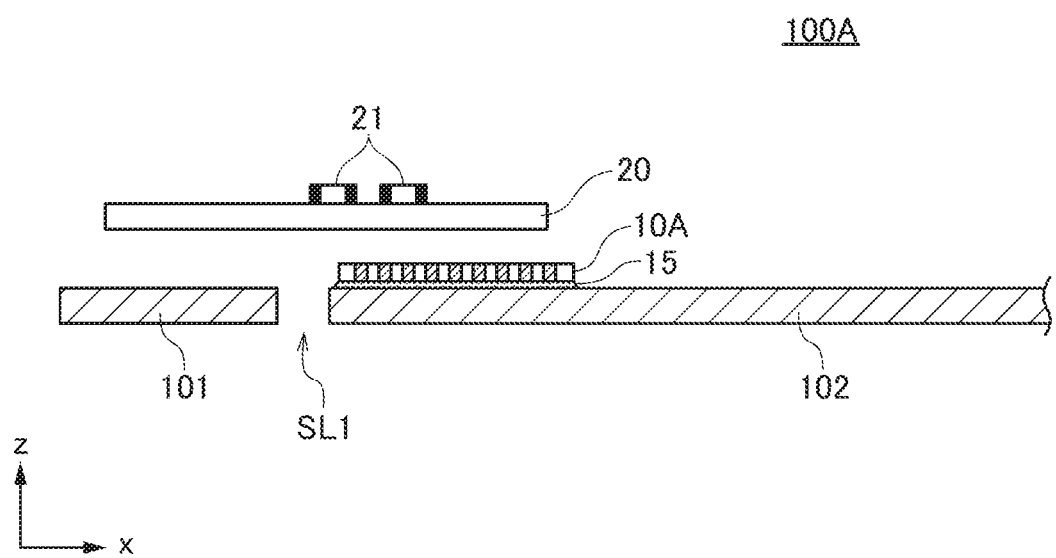
FIG. 8 is a partially cross-sectional view of the mobile wireless device.

FIG. 8 is a partially cross-sectional view of the mobile wireless device 100A.

As illustrated in FIG. 8, the solenoid coil 10A is bonded to the back surface of the metal layer 102 by an adhesive 15. A circuit substrate 20 is provided above the metal layers 101 and 102 so as to be arranged in parallel with the metal layers 101 and 102. While a large number of electronic components are implemented on the circuit substrate 20, only two electronic components 21 are illustrated in FIG. 8. The circuit substrate 20 covers both the metal layers 101 and 102 in a plan view.

Figure 9:
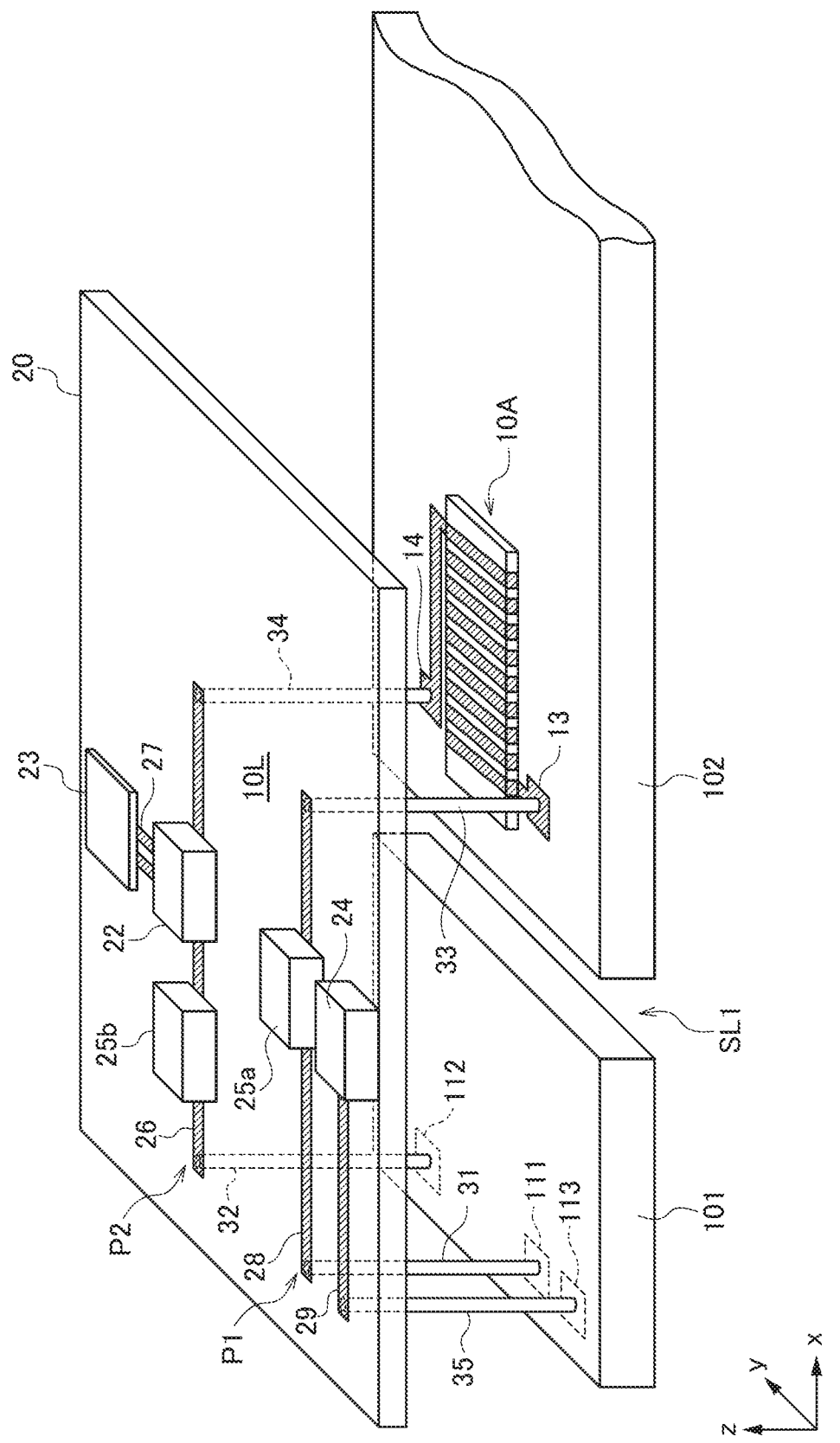
FIG. 9 is a schematic perspective view for explaining the configuration of an antenna device according to the first embodiment of the present invention.

FIG. 9 is a schematic perspective view for explaining the configuration of an antenna device according to the present embodiment.

As illustrated in FIG. 9, in addition to the electronic components 21 illustrated in FIG. 8, an impedance matching circuit 22, a transmission/reception circuit 23 for RFID, a transmission/reception circuit 24 for high-frequency communication, inductance elements 25a and 25b, and the like are mounted on the main surface of the circuit substrate 20.

The impedance matching circuit 22 is inserted into a wiring 26 and is used for impedance matching of an antenna device for RFID. The impedance matching circuit 22 and transmission/reception circuit 23 are connected by a wiring 27. For example, a frequency of 13.56 MHz is used for the antenna device for RFID. The transmission/reception circuit 24 for high-frequency communication is a transmission/reception circuit for another antenna device having a frequency band (e.g., several hundred MHz to several GHz) which is different from that used in the antenna device for RFID. The inductance elements 25a and 25b are inserted into wirings 28 and 26, respectively, and each play a role of blocking signal components of high-frequency communication. That is, the inductance elements 25a and 25b each allow signals in a frequency band (13.56 MHz) used for RFID to pass therethrough but exhibit a high impedance with respect to a signal in a frequency band (several hundred MHz to several GHz) used for high-frequency communication.

As illustrated in FIG. 9, one ends of the respective wirings 28 and 26 are connected to different areas 111 and 112 of the metal layer 101, respectively, through connection pins 31 and 32, and the other ends thereof are connected to terminals 13 and 14 of the solenoid coil 10A, respectively, through connection pins 33 and 34. One end of a wiring 29 is connected to an area 113 of the metal layer 101 through a connection pin 35.

The connection pins 31 to 35 are each a pin-shaped conductor fixed to the circuit substrate 20 at its one end, extending in the z-direction, and having a spring property in the z-direction. Thus, when the circuit substrate 20 and metal layers 101 and 102 are overlapped with each other with a predetermined interval interposed therebetween in the z-direction, the tip ends of the respective connection pins 31 to 35 abut against their corresponding areas on the metal layers 101 and 102, whereby electrical connection in the z-direction is established.

With the above configuration, the terminal 13 of the solenoid coil 10A and area 111 of the metal layer 101 are electrically connected to each other through a wiring pattern P1 including the connection pin 33, wiring 28 and connection pin 31. Similarly, the terminal 14 of the solenoid coil 10A and the area 112 of the metal layer 101 are electrically connected to each other through a wiring pattern P2 including the connection pin 34, wiring 26, and connection pin 32. The areas 111 and 112 of the metal layer 101 are positioned in different planes from each other, so that a loop antenna 10L is formed by the wiring pattern P1, metal layer 101 and wiring pattern P2, and both ends thereof are connected to the terminals 13 and 14 of the solenoid coil 10A.

The loop antenna 10L having the above configuration is connected in series to the solenoid coil 10A and thus functions as a part of the antenna device for RFID. In the present embodiment, the wiring patterns P1 and P2 constituting the loop antenna 10L cross the slit SL1 in a plan view, so that magnetic flux passing through the narrow slit SL1 can be captured by the loop antenna 10L even through most of the loop antenna 10L is covered by the metal layers 101 and 102. Further, a part of the magnetic flux passing through the slit SL1 is absorbed by the magnetic member 11 constituting the solenoid coil 10A.

Figure 10:
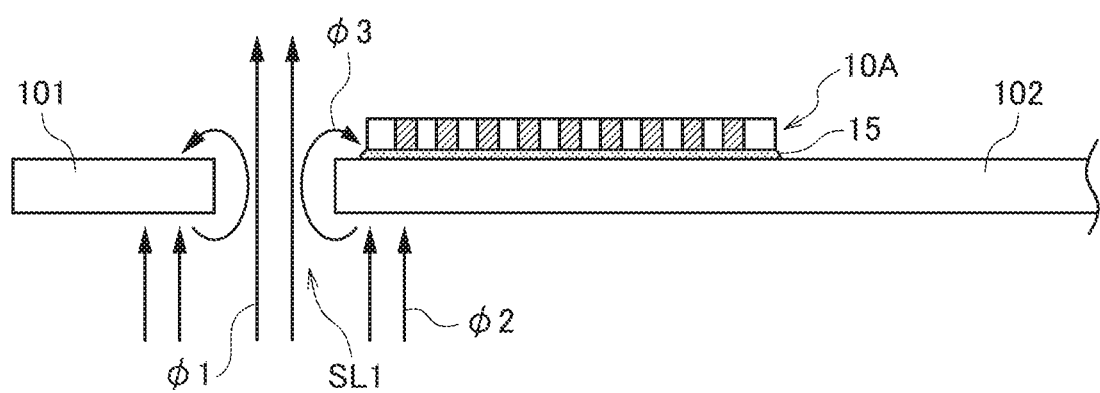
FIG. 10 is a schematic view illustrating magnetic flux emitted from an external reader/writer.

FIG. 10 is a schematic view illustrating magnetic flux emitted from an external reader/writer.

FIG. 10 illustrates magnetic fluxes φ1 and φ2 emitted from the reader/writer. The magnetic flux φ1 passes through the slit SL1, and the magnetic flux φ2 collides with the metal layers 101 and 102. The magnetic flux φ1 passes through the slit SL1 and then passes through the inner diameter part of the loop antenna 10L illustrated in FIG. 9 to be converted into current. On the other hand, the collision of the magnetic flux φ2 with the metal layers 101 and 102 generates a magnetic flux φ3 in the opposite direction so as to cancel the magnetic flux φ2. The magnetic flux φ3 comes around from the front surfaces (lower surfaces in FIG. 10) of the respective metal layers 101 and 102 to the back surfaces (upper surfaces in FIG. 10) thereof through the slit SL1, so that a part of the magnetic flux φ3 is efficiently absorbed by the solenoid coil 10A. That is, even though the solenoid coil 10A is completely covered by the metal layer 102 in a plan view, it can convert many magnetic fluxes into current by reducing the distance from the slit SL1 in the x-direction as the coil axis direction.

As described above, in the present embodiment, the magnetic flux passing through the slit SL1 is captured by the loop antenna 10L and solenoid coil 10A to be converted into current. Thus, even though most of the back surface of the mobile wireless device 100A is covered by the metal layers 101 to 103, a sufficient communication distance can be ensured in the antenna device for RFID.

The metal layer 101 constituting a part of the loop antenna 10L also functions as a radiation conductor of the antenna device for high-frequency communication. In this case, signals for high-frequency communication need to be separated from the loop antenna 10L. To this end, in the present embodiment, the inductance elements 25a and 25b are inserted into the wirings 28 and 26, respectively. With this configuration, the wirings 28 and 26 each exhibit a high impedance in a high-frequency band, allowing the signal components of both antennas to be separated from each other.

As described above, in the present embodiment, the wiring patterns P1 and P2 and metal layer 101 constitute the loop antenna 10L, and the inner diameter part of the loop antenna 10L overlaps the slit SL1, whereby magnetic flux passing through the slit SL1 can be captured. In addition, the solenoid coil 10A is connected in series to the loop antenna 10L, making it possible to extend a communication distance as compared with a case with the loop antenna 10L alone.

Further, in the present embodiment, the metal layer 101 constituting a part of the loop antenna 10L does not overlap the solenoid coil 10A in a plan view, making it possible to maximize the area of the inner diameter part of the loop antenna 10L in the xy plane. With this configuration, magnetic flux passing through the slit SL1 can be efficiently captured.

Further, in the present embodiment, the metal layer 101 is used as a part of the loop antenna 10L and also functions as a radiation conductor of the antenna device for high-frequency communication, making it possible to suppress an increase in the number of components.

<Second Embodiment>

Figure 11:
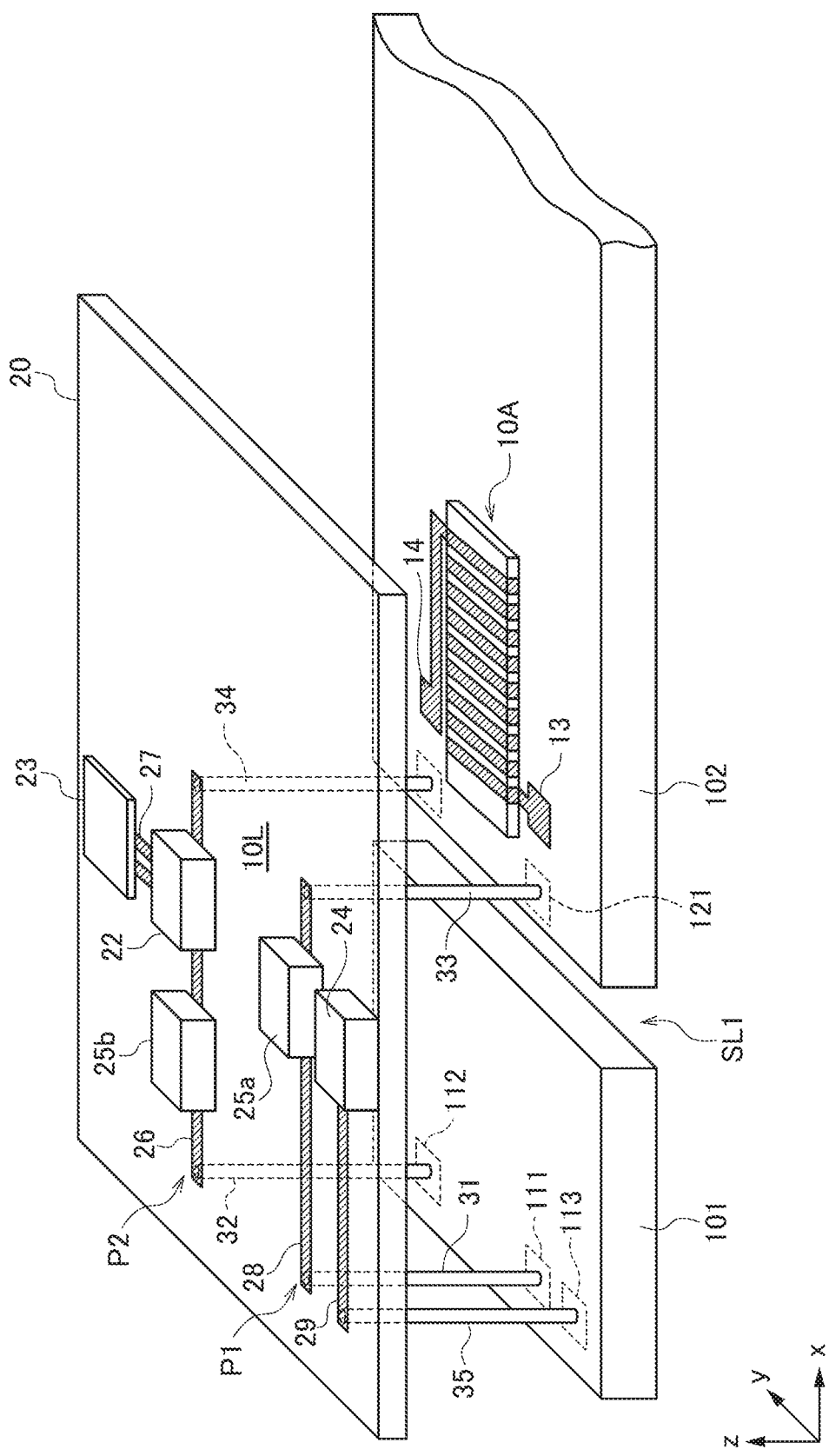
FIG. 11 is a schematic perspective view for explaining the configuration of an antenna device according to a second embodiment of the present invention.

FIG. 11 is a schematic perspective view for explaining the configuration of an antenna device according to the second embodiment of the present invention.

As illustrated in FIG. 11, in the antenna device according to the present embodiment, the tip ends of the respective connection pins 33 and 34 are connected not to the respective terminals 13 and 14 of the solenoid coil 10A, but to different areas 121 and 122 of the metal layer 102, respectively. On the other hand, the terminals 13 and 14 of the solenoid coil 10A are electrically connected to the metal layer 102. Other configurations are the same as those in the above-described first embodiment, and so the same reference numerals are given to the same elements, and overlapping description will be omitted.

In the present embodiment, the connection pins 33 and 34 are not directly connected to the respective terminals 13 and 14 of the solenoid coil 10A but through the metal layer 102. Even in this configuration, the same effects as those in the first embodiment can be obtained, and the degree of freedom in layout of the connection pins 33 and 34 can be significantly enhanced. In addition, the inner diameter size of the loop antenna 10L can be increased.

In the present embodiment, both the connection pins 33 and 34 are connected to the metal layer 102; however, only one of the connection pins 33 and 34 may be connected to the metal layer 102, and the other one thereof may be connected to the terminal 13 or 14 of the solenoid coil 10A.

<Third Embodiment>

Figure 12:
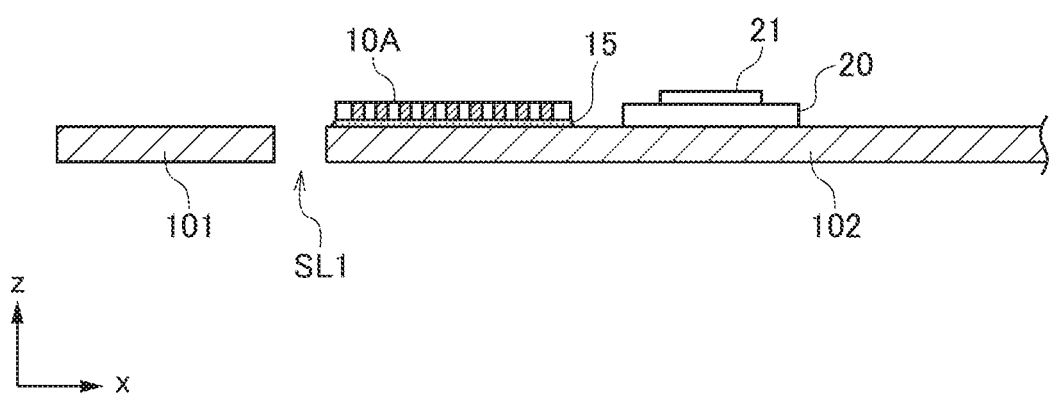
FIG. 12 is a partially cross-sectional view of a mobile wireless device provided with an antenna device according to a third embodiment of the present invention.

FIG. 12 is a partially cross-sectional view of a mobile wireless device 100B provided with an antenna device according to the third embodiment of the present invention.

As illustrated in FIG. 12, in the present embodiment, the solenoid coil 10A is bonded to the back surface of the metal layer 102 by the adhesive 15. The circuit substrate 20 is provided on the metal layer 102 in such a manner to be separated from the solenoid coil 10A at a different planar position. Although a large number of electronic components are implemented on the circuit substrate 20, only one electronic component 21 is illustrated in FIG. 12. As illustrated, both the solenoid coil 10A and circuit substrate 20 are disposed on the back surface of the metal layer 102 so as to completely overlap the metal layer 102.

Figure 13:
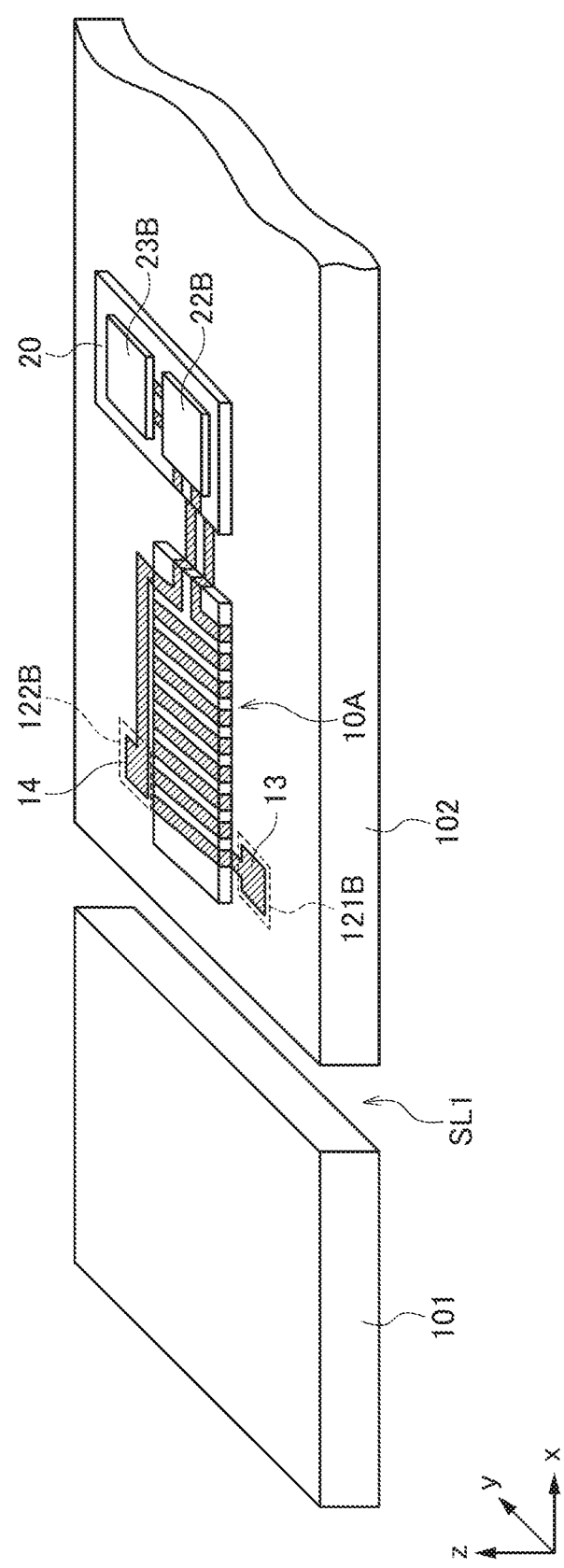
FIG. 13 is a schematic perspective view for explaining the configuration of the antenna device according to the third embodiment of the present invention.

FIG. 13 is a schematic perspective view for explaining the configuration of the antenna device according to the present embodiment.

As illustrated in FIG. 13, in the present embodiment, the impedance matching circuit 22B, the transmission/reception circuit 23B for RFID, and the like are mounted on the main surface of the circuit substrate 20.

The impedance matching circuit 22B is inserted in the middle of the conductor 12 constituting the solenoid coil 10A and is used for impedance matching of the antenna device for RFID. The impedance matching circuit 22B is connected with the transmission/reception circuit 23C. For example, a frequency of 13.56 MHz is used for the antenna device for RFID.

As illustrated in FIG. 13, the terminal 13 of the solenoid coil 10A is connected to the first area 121B of the metal layer 102. Similarly, the terminal 14 of the solenoid coil 10A is connected to the second area 122B of the metal layer 102. As a result, the terminals 13 and 14 are electrically connected to each other by the metal layer 102. That is, the metal layer 102 constitutes a part of the solenoid coil 10A.

Thus, a large loop is formed through the metal layer 102, so that it is possible to obtain enhanced antenna characteristics as compared with a case where the terminals 13 and 14 are connected directly to the impedance matching circuit 22B and transmission/reception circuit 23B for RFID, respectively.

The relationship between magnetic flux emitted from the external reader/writer and the solenoid coil 10A is as illustrated in FIG. 10.

That is, a part of the magnetic flux $\phi1$ passing through the slit SL1 is absorbed by the solenoid coil 10A to be converted into current. On the other hand, the collision of the magnetic flux $\phi2$ with the metal layers 101 and 102 generates the magnetic flux $\phi3$ in the opposite direction so as to cancel the magnetic flux $\phi2$. The magnetic flux $\phi3$ comes around from the front surfaces (lower surfaces in FIG. 10) of the respective metal layers 101 and 102 to the back surfaces (upper surfaces in FIG. 10) thereof through the slit SL1, so that a part of the magnetic flux $\phi3$ is efficiently absorbed by the solenoid coil 10A. That is, even though the solenoid coil 10A is completely covered by the metal layer 102 in a plan view, it can convert magnetic fluxes into current by reducing the distance from the slit SL1 in the x-direction as the coil axis direction.

As described above, in the present embodiment, a part of the magnetic flux passing through the slit SL1 is captured by the solenoid coil 10A to be converted into current. Further, one turn of the solenoid coil 10A forms a larger loop that goes through the metal layer 102, making it possible to obtain enhanced antenna characteristics. In addition, in the present embodiment, one end portion of the solenoid coil 10A in the coil axis direction is positioned in the vicinity of the slit SL1, allowing the magnetic flux $\phi3$ to be captured efficiently by the solenoid coil 10A. Thus, even through the most of the back surface of the mobile wireless device 100B is covered by the metal layers 101 to 103, a sufficient communication distance can be ensured in the antenna device for RFID.

Further, in the present embodiment, both the solenoid coil 10A and circuit substrate 20 are provided on the back surface of the metal layer 102 and completely covered by the metal layer 102, so that the planar size of the antenna device is not increased.

<Fourth Embodiment>

Figure 14:
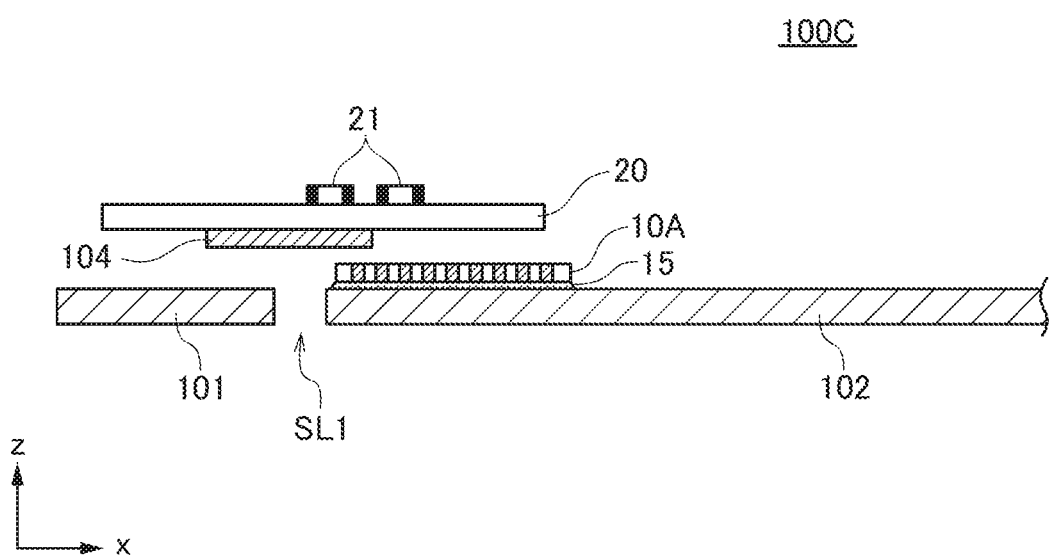
FIG. 14 is a partially cross-sectional view of a mobile wireless device provided with an antenna device according to a fourth embodiment of the present invention.

FIG. 14 is a partially cross-sectional view of a mobile wireless device 100C provided with an antenna device according to the fourth embodiment of the present invention.

As illustrated in FIG. 14, in the present embodiment, the solenoid coil 10A is bonded to the back surface of the metal layer 102 by the adhesive 15. The circuit substrate 20 is provided above the metal layers 101 and 102 so as to be arranged in parallel with the metal layers 101 and 102. Although a large number of electronic components are implemented on the circuit substrate 20, only two electronic components 21 are illustrated in FIG. 14. The circuit substrate 20 covers both the metal layers 101 and 102 in a plan view. Further, a metal layer 104 is formed on the back surface of the circuit substrate 20. Although not particularly limited, in the present embodiment, the metal layer 104 overlaps the slit SL1, metal layers 101 and 102, and solenoid coil 10A in a plan view.

Figure 15:
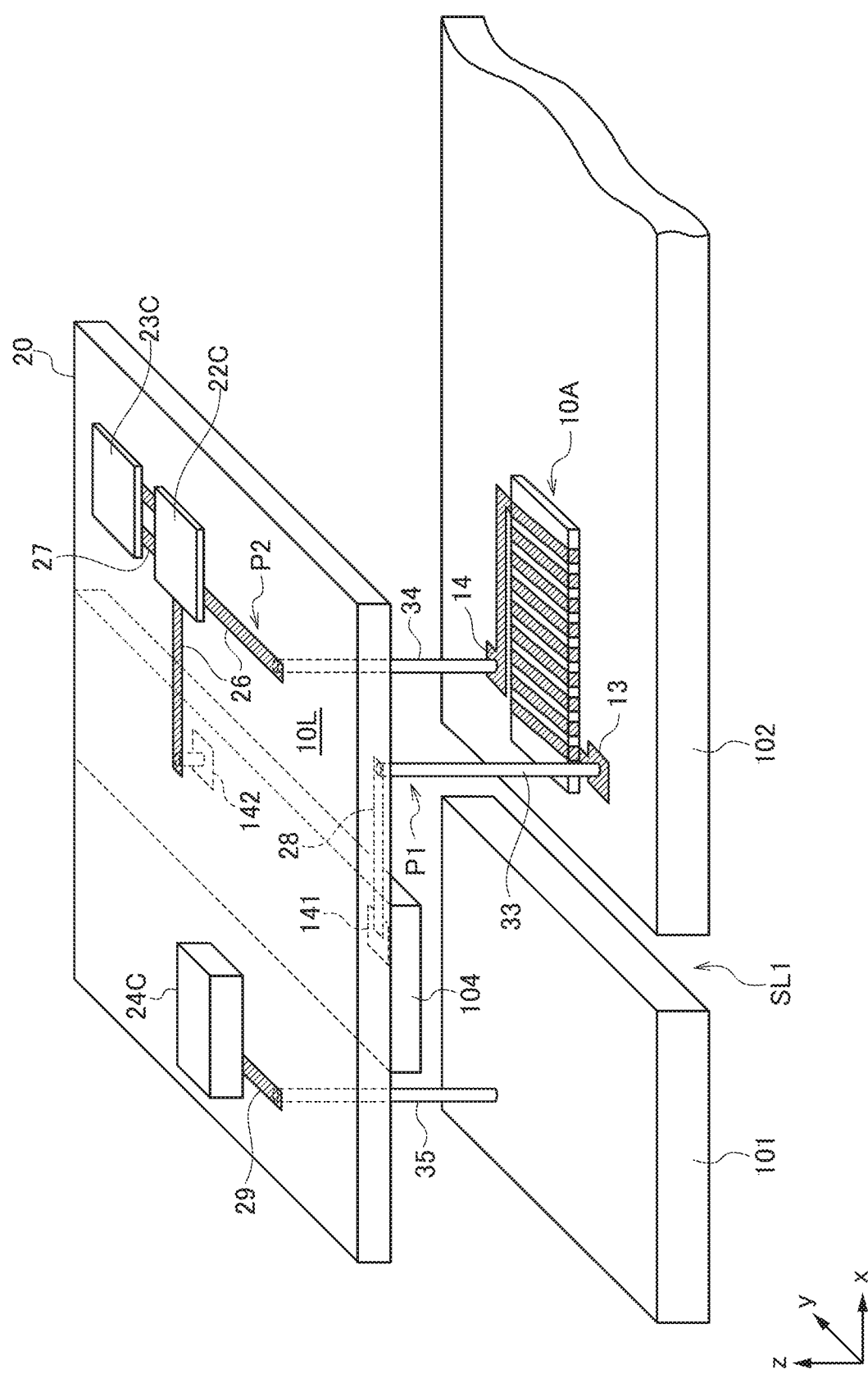
FIG. 15 is a schematic perspective view for explaining the configuration of the antenna device according to the fourth embodiment of the present invention.

FIG. 15 is a schematic perspective view for explaining the configuration of the antenna device according to the present embodiment.

As illustrated in FIG. 15, in the present embodiment, in addition to the electronic components 21 illustrated in FIG. 14, the impedance matching circuit 22C, transmission/reception circuit 23C for RFID, transmission/reception circuit 24C for high-frequency communication, and the like are mounted on the main surface of the circuit substrate 20.

The impedance matching circuit 22C is inserted into the wiring 26 and is used for impedance matching of the antenna device for RFID. The impedance matching circuit 22C and transmission/reception circuit 23C are connected by the wiring 27. For example, a frequency of 13.56 MHz is used for the antenna device for RFID. The transmission/reception circuit 24C for high-frequency communication is a transmission/reception circuit for another antenna device having a frequency band (e.g., several hundred MHz to several GHz) which is different from that used in the antenna device for RFID. The transmission/reception circuit 24C is connected to the wiring 29.

As illustrated in FIG. 15, one end of a wiring 28 provided on the back surface of the circuit substrate 20 is connected to a first area 141 of the metal layer 104, and the other end thereof is connected to the terminal 13 of the solenoid coil 10A through the connection pin 33. On the other hand, one end of the wiring 26 provided on the upper surface of the circuit substrate 20 is connected to a second area 142 of the metal layer 104, and the other end thereof connected to the terminal 14 of the solenoid coil 10A through the connection pin 34. Further, one end of the wiring 29 is connected to the metal layer 101 through the connection pin 35.

The connection pins 33 to 35 are each a pin-shaped conductor fixed to the circuit substrate 20 at its one end, extending in the z-direction, and having a spring property in the z-direction. Thus, when the circuit substrate 20 and metal layers 101 and 102 are overlapped with each other with a predetermined interval interposed therebetween in the z-direction, the tip ends of the respective connection pins 33 to 35 abut against their corresponding areas on the metal layers 101 and 102, whereby connection in the z-direction is established.

With the above configuration, the terminal 13 of the solenoid coil 10A and the area 141 of the metal layer 104 are connected to each other through a wiring pattern P1 including the connection pin 33 and wiring 28. Similarly, the terminal 14 of the solenoid coil 10A and the area 142 of the metal layer 104 are connected to each other through a wiring pattern P2 including the connection pin 35 and wiring 26.

The areas 141 and 142 of the metal layer 104 are positioned in planes different from each other, so that a loop antenna 10L is formed by the wiring pattern P1, metal layer 104, and wiring pattern P2, and both ends thereof are connected to the terminals 13 and 14 of the solenoid coil 10A.

The loop antenna 10L having the above configuration is connected in series to the solenoid coil 10A and thus functions as a part of the antenna device for RFID. In the present embodiment, the wiring patterns P1 and P2 constituting the loop antenna 10L cross the slit SL1 in a plan view, so that magnetic flux passing through the narrow slit SL1 can be captured by the loop antenna 10L even through most of the loop antenna 10L is covered by the metal layers 101 and 102. Further, a part of the magnetic flux passing through the slit SL1 is absorbed by the magnetic member 11 constituting the solenoid coil 10A.

The relationship between magnetic flux emitted from the external reader/writer and the solenoid coil 10A is as illustrated in FIG. 10.

That is, the magnetic flux $\phi1$ passing through the slit SL1 passes through the inner diameter part of the loop antenna 10L illustrated in FIG. 15 to be converted into current. On the other hand, the collision of the magnetic flux $\phi2$ with the metal layers 101 and 102 generates a magnetic flux $\phi3$ in the opposite direction so as to cancel the magnetic flux $\phi2$. The magnetic flux $\phi3$ comes around from the front surfaces (lower surfaces in FIG. 10) of the respective metal layers 101 and 102 to the back surfaces (upper surfaces in FIG. 10) thereof through the slit SL1, so that a part of the magnetic flux $\phi3$ is efficiently absorbed by the solenoid coil 10A. That is, even though the solenoid coil 10A is completely covered by the metal layer 102 in a plan view, it can convert many magnetic fluxes into current by reducing the distance from the slit SL1 in the x-direction as the coil axis direction.

As described above, in the present embodiment, the magnetic flux passing through the slit SL1 is captured by the loop antenna 10L and solenoid coil 10A to be converted into current. Thus, even though most of the back surface of the mobile wireless device 100A is covered by the metal layers 101 to 103, a sufficient communication distance can be ensured in the antenna device for RFID. The metal layer 101 is used as a radiation conductor of the antenna device for high-frequency communication.

As described above, in the present embodiment, the wiring patterns P1 and P2 and metal layer 104 constitute the loop antenna 10L, and the inner diameter part of the loop antenna 10L overlaps the slit SL1, whereby magnetic flux passing through the slit SL1 can be captured. In addition, the solenoid coil 10A is connected in series to the loop antenna 10L, making it possible to extend a communication distance as compared with a case with the loop antenna 10L alone.

Further, in the present embodiment, the loop antenna 10L is not connected to the metal layers 101 and 102 constituting a part of the casing, so that an arbitrary potential or signal can be given to the metal layers 101 and 102. For example, in the present embodiment, the metal layer 101 can be used as a radiation conductor of the antenna device for high-frequency communication.

<Fifth Embodiment>

Figure 16:
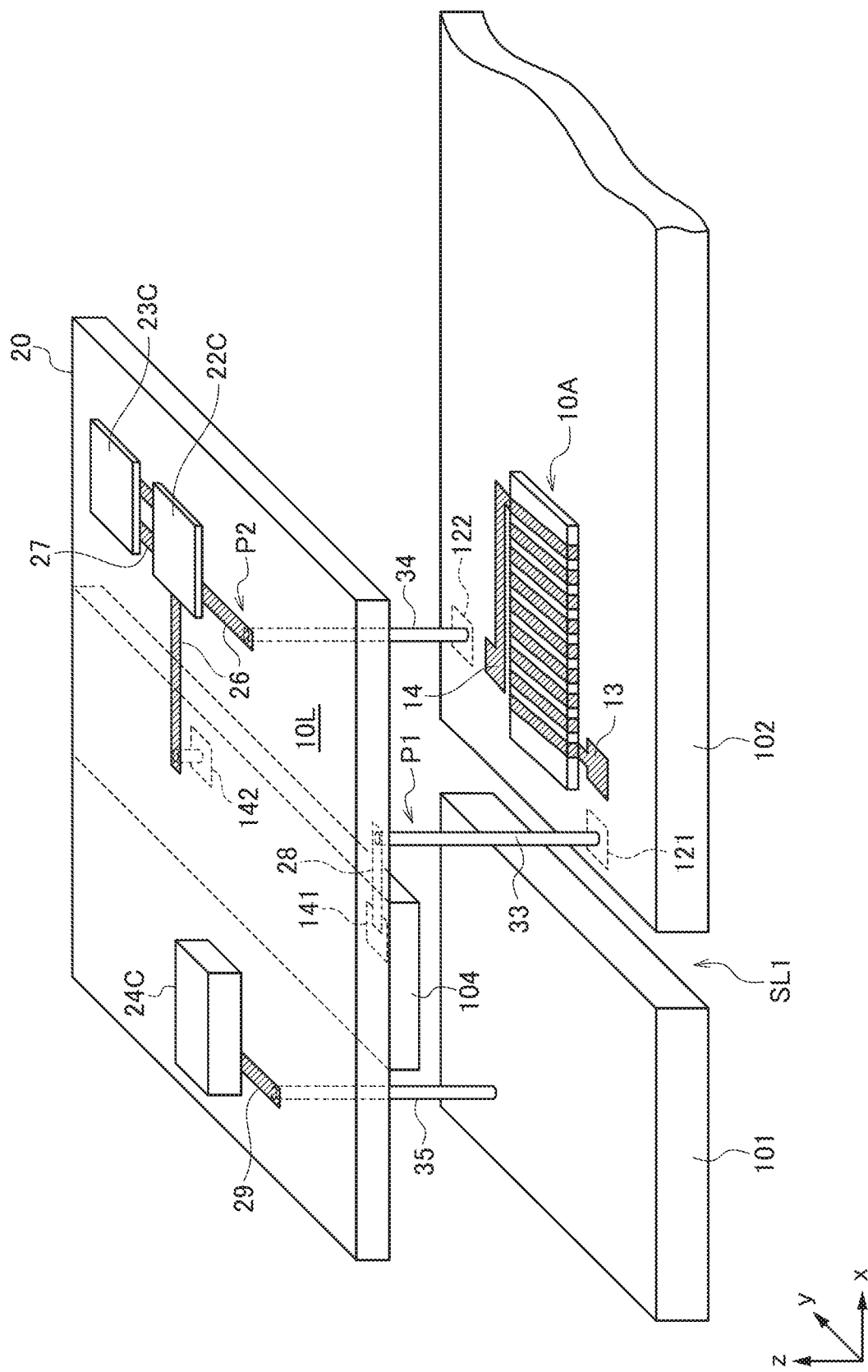
FIG. 16 is a schematic perspective view for explaining the configuration of the antenna device according to a fifth embodiment of the present invention.

FIG. 16 is a schematic perspective view for explaining the configuration of an antenna device according to the fifth embodiment of the present invention.

As illustrated in FIG. 16, in the antenna device according to the present embodiment, the tip ends of the respective connection pins 33 and 34 are connected not to the respective terminals 13 and 14 of the solenoid coil 10A, but to different areas 121 and 122 of the metal layer 102, respectively. On the other hand, the terminals 13 and 14 of the solenoid coil 10A are electrically connected to the metal layer 102. Other configurations are the same as those in the above-described fourth embodiment, and so the same reference numerals are given to the same elements, and overlapping description will be omitted.

In the present embodiment, the connection pins 33 and 34 are not directly connected to the respective terminals 13 and 14 of the solenoid coil 10A but through the metal layer 102. Even in this configuration, the same effects as those in the fourth embodiment can be obtained, and the degree of freedom in layout of the connection pins 33 and 34 can be significantly enhanced. In addition, the inner diameter size of the loop antenna 10L can be increased.

In the present embodiment, both the connection pins 33 and 34 are connected to the metal layer 102; however, only one of the connection pins 33 and 34 may be connected to the metal layer 102, and the other one thereof may be connected to the terminal 13 or 14 of the solenoid coil 10A.

While the preferred embodiments of the present invention have been described, the present invention is not limited thereto. Thus, various modifications may be made without departing from the gist of the invention, and all of the modifications thereof are included in the scope of the present invention.

For example, although the electronic components 21 to 25 and wiring 26 to 29 are formed on the upper surface of the circuit substrate 20 in the above first and second embodiments, some or all of them may be formed on the lower surface (surface facing the metal layers 101 and 102) of the circuit substrate 20.

Further, although the electronic components 21 and 22C to 24C are formed on the upper surface of the circuit substrate 20, and the metal layer 104 is formed on the back surface of the circuit substrate 20 in the fourth and fifth embodiments, they may be formed on either the upper surface or lower surface.

Further, although the metal layer 104 is disposed so as to overlap the slit SL1, metal layers 101 and 102, and solenoid coil 10A in a plan view in the fourth and fifth embodiments, this is not essential in the present invention. However, by designing the position of the metal layer 104 such that the inner diameter part of the loop antenna 10L overlaps the slit SL1 in a plan view, more magnetic fluxes can be captured by the loop antenna 10L.

Further, although the solenoid coil 10A (or meander coil 10B) is completely covered by the metal layer 102 in the first to fifth embodiments, this is not essential in the present invention, and only a part of the solenoid coil 10A (or meander coil 10B) may be covered by the metal layer 102, or the solenoid coil 10A (or meander coil 10B) may not be covered by the metal layer 102. However, when the metal layer 102 has a large area, it is difficult to obtain satisfactory antenna characteristics, so that the present invention is effective particularly in such a configuration. Rather, as described using FIG. 10, by completely covering the solenoid coil 10A (or meander coil 10B) by the metal layer 102 and disposing the solenoid coil 10A in the vicinity of the slit SL1, more magnetic fluxes can be captured.

Further, although the metal layers 101 and 102 constitute a part of the casing of the mobile wireless terminal (100A to 100C) in the first to fifth embodiments, this is not essential in the present invention. Further, the solenoid coil 10A (or meander coil 10B) need not necessarily be bonded to the metal layer 102 but may be mounted on the circuit substrate 20.

What is claimed is:

1. An antenna device comprising:
   a first metal layer having first and second areas;
   a coil pattern having first and second terminals;
   a first wiring pattern connected between the first area of the first metal layer and the first terminal of the coil pattern;
   a second wiring pattern connected between the second area of the first metal layer and the second terminal of the coil pattern; and
   a circuit substrate arranged in substantially parallel with the first metal layer,
   wherein the first metal layer, the first wiring pattern, and the second wiring pattern constitute at least a part of a loop antenna,
   wherein the first wiring pattern includes a first wiring formed on the circuit substrate and a first connection pin provided substantially perpendicular to the circuit substrate, the first connection pin being connected between one end of the first wiring and the first area of the first metal layer, and
   wherein the second wiring pattern includes a second wiring formed on the circuit substrate and a second connection pin provided substantially perpendicular to the circuit substrate, the second connection pin being connected between one end of the second wiring and the second area of the first metal layer.

2. The antenna device as claimed in claim 1, wherein the coil pattern does not overlap the first metal layer in a plan view.

3. The antenna device as claimed in claim 1, further comprising a first transmission/reception circuit connected to the first or second wiring pattern.

4. The antenna device as claimed in claim 3, further comprising a second transmission/reception circuit connected to the first metal layer, the second transmission/reception circuit having a signal transmission/reception frequency band that is different from a signal transmission/reception frequency band of the first transmission/reception circuit.

5. The antenna device as claimed in claim 4, further comprising an inductance element inserted into the first or second wiring pattern.

6. The antenna device as claimed in claim 1,
   wherein the first wiring pattern further includes a third connection pin provided substantially perpendicular to the circuit substrate, the third connection pin being connected between other end of the first wiring and the first terminal of the coil pattern, and
   wherein the second wiring pattern further includes a fourth connection pin provided substantially perpendicular to the circuit substrate, the fourth connection pin being connected between other end of the second wiring and the second terminal of the coil pattern.

7. The antenna device as claimed in claim 6, wherein the first area of the first metal layer and the first terminal of the coil pattern is connected to each other through at least the first wiring pattern and second metal layer, thereby at least a part of the loop antenna is formed by the first metal layer, second metal layer, first wiring pattern, and second wiring pattern.

8. The antenna device as claimed in claim 1, further comprising a second metal layer that is substantially coplanar with the first metal layer.

9. The antenna device as claimed in claim 8, wherein at least a part of the coil pattern overlaps the second metal layer in a plan view.

10. The antenna device as claimed in claim 1, wherein the coil pattern includes a solenoid coil having a magnetic member and a conductor wound around the magnetic member.

11. The antenna device as claimed in claim 1, wherein the coil pattern includes a meander conductor.

12. The antenna device as claimed in claim 11, wherein the coil pattern further includes a waveform magnetic member, and vertical positions of the waveform magnetic member and the meander conductor are alternately changed.

13. A mobile wireless device having an antenna device, the antenna device comprising:
a first metal layer having first and second areas;
a coil pattern having first and second terminals;
a first wiring pattern connected between the first area of the first metal layer and the first terminal of the coil pattern;
a second wiring pattern connected between the second area of the first metal layer and the second terminal of the coil pattern; and
a circuit substrate arranged in substantially parallel with the first metal layer,
wherein the first metal layer, the first wiring pattern, and the second wiring pattern constitute at least a part of a loop antenna,
wherein the first wiring pattern includes a first wiring formed on the circuit substrate and a first connection pin provided substantially perpendicular to the circuit substrate, the first connection pin being connected between one end of the first wiring and the first area of the first metal layer, and
wherein the second wiring pattern includes a second wiring formed on the circuit substrate and a second connection pin provided substantially perpendicular to the circuit substrate, the second connection pin being connected between one end of the second wiring and the second area of the first metal layer.

14. The mobile wireless device as claimed in claim 13, wherein the first metal layer is a part of a casing of the mobile wireless device.

15. An antenna device comprising:
a first metal layer;
a second metal layer provided in a plane different from that of the first metal layer and having first and second areas;
a coil pattern having first and second terminals, at least a part of the coil pattern overlapping the first metal layer in a plan view;
a first wiring pattern connected between the first area of the second metal layer and the first terminal of the coil pattern;
a second wiring pattern connected between the second area of the second metal layer and the second terminal of the coil pattern; and
a circuit substrate on which the second metal layer is formed,
wherein the second metal layer, first wiring pattern and second wiring pattern constitute at least a part of a loop antenna,
wherein the first wiring pattern includes a first wiring formed on the circuit substrate and a first connection pin provided substantially perpendicular to the circuit substrate, the first wiring having one end connected to the first area of the second metal layer, the first connection pin being connected between other end of the first wiring and the first terminal of the coil pattern, and
wherein the second wiring pattern includes a second wiring formed on the circuit substrate and a second connection pin provided substantially perpendicular to the circuit substrate, the second wiring having one end connected to the second area of the second metal layer, the second connection pin being connected between other end of the second wiring and the second terminal of the coil pattern.

16. The antenna device as claimed in claim 15, further comprising a third metal layer that is substantially coplanar with the first metal layer so that a slit is formed between the first and third metal layers.

17. The antenna device as claimed in claim 16, wherein an inner diameter part of the loop antenna overlaps the slit in a plan view.

18. The antenna device as claimed in claim 15, wherein the first area of the second metal layer and the first terminal of the coil pattern is connected to each other through at least the first wiring pattern and first metal layer, thereby at least a part of the loop antenna is formed by the first metal layer, second metal layer, first wiring pattern, and second wiring pattern.

19. The antenna device as claimed in claim 15, wherein the coil pattern includes a solenoid coil having a magnetic member and a conductor wound around the magnetic member.

20. The antenna device as claimed in claim 15, wherein the coil pattern includes a meander conductor.

21. The antenna device as claimed in claim 20, wherein the coil pattern further includes a waveform magnetic member, and vertical positions of the waveform magnetic member and the meander conductor are alternately changed.

22. A mobile wireless device having an antenna device, the antenna device comprising:
a first metal layer;
a second metal layer provided in a plane different from that of the first metal layer and having first and second areas;
a coil pattern having first and second terminals, at least a part of the coil pattern overlapping the first metal layer in a plan view;
a first wiring pattern connected between the first area of the second metal layer and the first terminal of the coil pattern;
a second wiring pattern connected between the second area of the second metal layer and the second terminal of the coil pattern; and
a circuit substrate on which the second metal layer is formed,
wherein the second metal layer, first wiring pattern and second wiring pattern constitute at least a part of a loop antenna,
wherein the first wiring pattern includes a first wiring formed on the circuit substrate and a first connection pin provided substantially perpendicular to the circuit substrate, the first wiring having one end connected to the first area of the second metal layer, the first connection pin being connected between other end of the first wiring and the first terminal of the coil pattern, and
wherein the second wiring pattern includes a second wiring formed on the circuit substrate and a second connection pin provided substantially perpendicular to the circuit substrate, the second wiring having one end connected to the second area of the second metal layer, the second connection pin being connected between other end of the second wiring and the second terminal of the coil pattern.

23. The mobile wireless device as claimed in claim 22, wherein the first metal layer is a part of a casing of the mobile wireless device.

24. An antenna device comprising:
a first metal layer;
a second metal layer provided in a plane different from that of the first metal layer and having first and second areas;
a coil pattern having first and second terminals, at least a part of the coil pattern overlapping the first metal layer in a plan view;
a first wiring pattern connected between the first area of the second metal layer and the first terminal of the coil pattern; and
a second wiring pattern connected between the second area of the second metal layer and the second terminal of the coil pattern,
wherein the second metal layer, first wiring pattern and second wiring pattern constitute at least a part of a loop antenna,
wherein the first area of the second metal layer and the first terminal of the coil pattern is connected to each other through at least the first wiring pattern and first metal layer, thereby at least a part of the loop antenna is formed by the first metal layer, second metal layer, first wiring pattern, and second wiring pattern.

25. The antenna device as claimed in claim 24, further comprising a third metal layer that is substantially coplanar with the first metal layer so that a slit is formed between the first and third metal layers.

26. The antenna device as claimed in claim 25, wherein an inner diameter part of the loop antenna overlaps the slit in a plan view.

27. The antenna device as claimed in claim 24, wherein the coil pattern includes a solenoid coil having a magnetic member and a conductor wound around the magnetic member.

28. The antenna device as claimed in claim 24, wherein the coil pattern includes a meander conductor.

29. The antenna device as claimed in claim 28, wherein the coil pattern further includes a waveform magnetic member, and vertical positions of the waveform magnetic member and the meander conductor are alternately changed.

30. A mobile wireless device having an antenna device, the antenna device comprising:
a first metal layer;
a second metal layer provided in a plane different from that of the first metal layer and having first and second areas;
a coil pattern having first and second terminals, at least a part of the coil pattern overlapping the first metal layer in a plan view;
a first wiring pattern connected between the first area of the second metal layer and the first terminal of the coil pattern; and
a second wiring pattern connected between the second area of the second metal layer and the second terminal of the coil pattern,
wherein the second metal layer, first wiring pattern and second wiring pattern constitute at least a part of a loop antenna,
wherein the first area of the second metal layer and the first terminal of the coil pattern is connected to each other through at least the first wiring pattern and first metal layer, thereby at least a part of the loop antenna is formed by the first metal layer, second metal layer, first wiring pattern, and second wiring pattern.

31. The mobile wireless device as claimed in claim 30, wherein the first metal layer is a part of a casing of the mobile wireless device.

* * * * *